Patented Oct. 4, 1938

2,132,355

UNITED STATES PATENT OFFICE 2,132,355

SEPARATION OF WAX FROM HYDROCARBON OILS

Edwin C. Knowles, Beacon, N. Y., assignor to The Texas Company, New York, N. Y., a corporation of Delaware No Drawing. Application May 15, 1936, Serial No. 79,924

4 Claims. (Cl. 196—18)

This invention relates to the separation of wax from hydrocarbon oils, and more particularly to the separation of wax from mineral lubricating oils.

The invention broadly contemplates a process for dewaxing wax-bearing oil in which the wax-bearing oil is mixed with a selective solvent, and the wax removed from the mixture of solvent and oil by filtration at relatively low temperatures in the presence of an organic filter-aid material.

The invention contemplates using as the filter-aid material an organic liquid compound which, at the low temperatures prevailing during dewaxing, crystallizes to form long needle-type crystals. In the operation of the process of this invention, these needle-type crystals are formed in the mixture of wax-bearing oil and solvent during chilling to precipitate the wax. The resulting precipitate comprises a mixture of solidified wax hydrocarbons and crystals of the organic filter-aid material. When the chilled mixture containing the precipitated material is filtered, the resulting filter cake is rigid and resistant to the formation of cracks or fractures during the subsequent cake washing and drying steps. The presence of the filter-aid material in the form of long needle-type crystals thus serves to knit together the particles of solid wax and to produce a filter cake which is particularly well adapted to washing and drying for the removal of retained oil and solvent, and in this respect is superior to the filter cake obtained by the prior art methods of dewaxing by filtration.

A further advantage of my invention resides in the use of a substance which, in the liquid form, serves as an anti-solvent for wax, and while in crystalline form provides a highly desirable filter-aid material. Thus, I contemplate using the substance of my invention in combination with a good oil solvent and under such conditions that a portion of the substance remains in liquid form at the dewaxing temperatures to impart wax anti-solvent qualities to the solvent mixture, while part crystallizes to form a filter-aid material.

I have discovered that dioxane, a compound having the following structural formula:

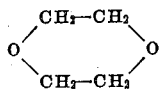

provides a filter-aid material which forms long needle-type crystals of the desired character. It crystallizes from a mixture of wax-bearing oil and dewaxing solvent in the form of relatively thin crystals about one-half to five-eighths of an inch in length. When crystals of this material are present in the wax filter cake, they serve to very substantially reinforce the wax cake, so that the wax cake containing them is relatively resistant to the formation of cracks or fractures during the steps of washing the filter cake with solvent, and then subsequently drying the cake by passing or forcing therethrough air or some other gaseous drying medium.

My invention, therefore, involves dewaxing wax-bearing mineral oil at temperatures of around 0° F. and lower with a solvent mixture containing dioxane as one of its components and in sufficient amount to form crystals at these low temperatures.

Dioxane begins to form crystals at 11° F. from a selective solvent liquid mixture, such as a mixture consisting of 40% dioxane, 50% isopropyl ether, and 10% methyl ethyl ketone. In the case of a mixture consisting of 30% dioxane, 50% isopropyl ether, and 20% methyl ethyl ketone, crystals begin to form at a temperature of —4° F.

I am aware that dioxane has been used heretofore as a component part of a dewaxing solvent for the separation of wax at temperatures substantially above 0° F. Prior to my invention, however, it has been unknown to use dioxane for the purpose of providing a filter-aid material consisting of long needle-type crystals suitable for producing a reinforced wax filter cake resistant to cracking or fracturing during washing and drying.

I am also aware of the fact that crystals of certain organic liquids have been used heretofore in the prior art as a filter-aid in the dewaxing of mineral oils. Such compounds as have been used heretofore, however, do not provide crystals of the long needle-type and which are particularly suitable for the production of wax filter cakes adapted to permit efficient washing for the removal of retained oil.

One of the major difficulties encountered in dewaxing by filtration resides in the readiness with which the wax filter cake develops cracks during washing and drying. The wax cake will develop cracks before the washing and drying of the filter cake is completed. For example, in some instances, such cracks have been observed as developing within a few seconds' time after the commencement of washing the cake. The objection to this, of course, is that immediately upon formation of a fracture or crack in the filter cake, the washing liquid or solvent thereupon short circuits through the opening in the cake instead of penetrating the entire cake and passing through the cake in the manner prevailing during normal filtration. The result of this is that the washing is not efficient, and the oil retained in the wax cake is not completely removed.

On the other hand, by forming a wax filter cake which is relatively resistant to the development of cracks, the washing step is rendered much more efficient and can be accomplished with greater economy in the amount of wash solvent and gaseous drying medium required. I have found, for example, that in the case of wax filter cakes reinforced through the presence of an organic filter-aid of the character of crystallized dioxane, the wax did not develop cracks during the passage of air through it for a period of five minutes or more.

More specifically, my invention comprises mixing wax-bearing lubricating oil with a selective solvent which exerts selective solvent action as between wax and oil at temperatures of 0° F. and below. A suitable solvent comprises a mixture of a good oil solvent and a wax anti-solvent, such as a mixture of isopropyl ether and methyl ethyl ketone in the proportion of about three parts of ether to two parts of ketone. Other oil solvents may comprise ethyl ether, benzol, toluol, naphtha, and relatively lighter petroleum hydrocarbon fractions. Other anti-solvents may be used as, for example, acetone.

To the selective solvent mixture, or to the mixture of selective solvent and oil, is added a suitable amount of dioxane so that, upon chilling to temperatures of 0° to −15° F., for example, sufficient of the dioxane is crystallized to produce a wax filter cake containing about 10% to 20% of dioxane crystals by weight of the wax cake.

The organic filter-aid material of my invention also possesses the properties of a wax anti-solvent. It is, therefore, in some instances, contemplated using a 2-component mixture, such as a mixture of isopropyl ether and dioxane. The dioxane is present in sufficient amounts such that a suitable proportion of it remains in the liquid state during the dewaxing step so as to thus impart wax anti-solvent properties to the chilled solvent mixture.

I prefer to use, however, a 3-component solvent mixture, such as a mixture containing 40% to 50% of isopropyl ether, 20% to 35% of methyl ethyl ketone, and 20% to 35% of dioxane. Where a wax anti-solvent liquid, such as methyl ethyl ketone, is added as a third solvent to the combination, it is possible to vary the dioxane content against the methyl ethyl ketone content, holding the isopropyl ether constant, and thus controlling the amount of dioxane which will crystallize out at the low chilling and filtering temperatures. The mixture is thus adjusted so as to obtain a wax filter cake which contains about 10% to 20% by weight of dioxane crystals.

The mixture of wax-bearing oil and selective solvent containing the organic filter-aid material may be heated, if desired, to a temperature of around 170° F. in order to realize entirely complete solution of the wax-bearing oil and its resinous and asphaltic constituents in the solvent. Thereupon, the mixture is chilled to a temperature of from 0° to −15° F. Lower chilling temperatures may be employed, depending upon the degree of pour test desired. The chilled mixture is then subjected to filtration advantageously in a rotary drum type of filter wherein the precipitated material, comprising wax and crystals of organic filter-aid material is removed from the dewaxed mixture in the form of a filter cake.

The filter cake formed upon that portion of the rotary drum which has emerged from the filtering mixture is subjected to washing with a wash solvent in the customary manner. This wash solvent is advantageously of substantially the same composition as the solvent present in the dewaxed filtrate. The washing step is continued for a short interval to remove the mother liquor from the filter cake. Thereafter, the washed filter cake is subjected to drying during another interval by forcing therethrough air or other gaseous drying medium, such as flue gas.

The dried filter cake is then removed from the filter, and the solvent and organic filter-aid material removed from the wax by distillation or vaporization. Since the filter-aid material, namely, dioxane, has a relatively low boiling point, for example, around 214.5° F., it is readily separated from the wax along with the solvent.

It is also contemplated that, instead of adding the organic filter-aid material to the mixture of wax-bearing oil and selective solvent, the filter surface may instead be precoated with a mat of dioxane crystals before actual wax filtration is commenced. The preferred procedure, however, is to have all of the dioxane crystals in the chilled mixture.

By way of example, a wax-bearing lubricating oil distillate of about 70 Saybolt seconds viscosity at 210° F. and derived from Mid-Continent crude was dewaxed in the following manner: This distillate was mixed with a solvent composed of 45% isopropyl ether, 25% methyl ethyl ketone, and 30% dioxane. The ratio of solvent mixture to oil was two parts of solvent mixture to one part of oil.

A wax crystal modifying material comprising a mixture of Montan wax and aluminum stearate was added to the mixture, the amount thus added being 0.05% by weight of Montan wax and 0.20% by weight of aluminum stearate on the basis of the weight of the oil charged.

The mixture was then heated to a temperature of 170° F. in order to realize conditions of true solution of the wax-bearing oil in the solvent.

The heated mixture was chilled to a temperature of −15° F. and then filtered at this temperature to produce a dewaxed filtrate and a wax filter cake containing crystals of dioxane.

The filter cake was washed in situ by forcing through the filter a wash solvent mixture composed of 45% isopropyl ether, 30% methyl ethyl ketone, and 25% dioxane, using one part of wash solvent mixture to one part of original wax-bearing oil charge. The wash solvent was chilled to −15° F. prior to passage through the filter.

The yield of wax-free oil obtained before washing the filter cake amounted to about 72.4% of the original charge. The oil recovered from the filter cake in the washing step was added to that obtained in the initial filtration, and the combined yield of wax-free oil amounted to 87.0% of the original charge. The pour test of the oil thus obtained was around 0° to −5° F.

The filter cake was subjected to drying following the washing step by passing air therethrough. The washed and dried filter cake was about 1⅛″ in thickness. In appearance it was very dry and free from cracks after having been subjected to washing and air drying for a period of five minutes or more.

The slack wax obtained from the filter cake after removing the retained solvent and filter-aid material had a melting point of 141° F. and contained about 79.3% paraffin having a melting point of about 145° F.

The foregoing example describes the operations of the invention as applied to the dewaxing of a distillate stock. The invention, however, is applicable to other types of wax-bearing oils, either distillate or residual.

Obviously, many modifications and variations of the invention, as hereinbefore set forth, may be made without departing from the spirit and scope thereof, and therefore only such limitations should be imposed as are indicated in the appended claims.

I claim:

1. The method of dewaxing wax-bearing mineral oil which comprises mixing with the oil a solvent liquid mixture comprising 40% to 50% isopropyl ether, 20% to 35% methyl ethyl ketone, and 20% to 35% dioxane, chilling the mixture to a temperature of around 0° F. and below to form a precipitate comprising solidified wax and crystals of dioxane, and filtering the cold mixture to remove the resulting precipitate.

2. The method of dewaxing wax-bearing mineral oil by filtration in the presence of a filter-aid material at temperatures of 0° F. and below comprising mixing with the oil a solvent mixture comprising an aliphatic ketone, a good oil solvent such as benzol and isopropyl ether, and dioxane, the dioxane being largely in the form of long needle-type crystals at temperatures of 0° F. and below, chilling the mixture to a temperature of the order of 0° F. and below to form a precipitate of solidified wax and filter-aid material, and filtering the cold mixture to remove the resulting precipitate.

3. In the dewaxing of oil by filtration at low temperature wherein a filter cake of wax is formed, washed and subsequently dried, the method of dewaxing wax-bearing mineral oil to produce oil having a pour test of around 0° F. and substantially the same as the temperature at which the oil is dewaxed which comprises mixing the oil with a selective solvent which at dewaxing temperatures such as 0° F. exerts the essential selective solvent action of a mixture of about three parts isopropyl ether and two parts methyl ethyl ketone as between wax and oil, incorporating therein dioxane in an amount such that upon chilling to 0° F. and filtering to remove the precipitated wax as a filter cake the dioxane is largely present in the cake in the form of long needle-type crystals so that the cake is rendered resistant to cracking during washing and drying, chilling the mixture to a temperature of 0° F. and below to precipitate wax, and filtering the mixture to remove the precipitated wax.

4. In the dewaxing of oil by filtration at low temperature wherein a filter cake of wax is formed, washed and subsequently dried, the method of dewaxing wax-bearing mineral oil to produce oil having a pour test of 0° F. and below which comprises mixing the oil with a solvent having substantially complete selective action as between oil and wax at a temperature of 0° F. and below and comprising an oil-solvent, a wax anti-solvent non-crystal forming at temperatures as low as 0° F. and dioxane, chilling the mixture to a temperature of 0° F. and below to precipitate wax and dioxane in the form of a filter-aid, and filtering the chilled mixture forming a filter cake of wax resistant to cracking during washing and drying.

EDWIN C. KNOWLES.